United States Patent Office 2,950,954
Patented Aug. 30, 1960

2,950,954
METHOD OF PREPARING ACID SALTS OF HYDROXYLAMINE

Irving L. Mador and Louis J. Rekers, Cincinnati, Ohio, assignors to National Distillers and Chemical Corporation, New York, N.Y., a corporation of Virginia No Drawing. Filed Sept. 23, 1957, Ser. No. 685,431

13 Claims. (Cl. 23—190)

This invention relates to a new and improved method for the preparation of hydroxylamine. More particularly, the invention pertains to catalytic hydrogenation of N-nitroso dialkylamines to produce hydroxylamine.

Hydroxylamine and various salts thereof have found increased use as intermediates in the preparation of many valuable organic and inorganic compounds. The use of hydroxylamine in the preparation of oximes and as a chain stopping agent in peroxide-catalyzed polymerizations is well known. Previously proposed methods for the preparation of hydroxylamine and salts thereof have the disadvantage of either low yields or expensive reactants and recovery steps.

One object of this invention is to provide a process for the preparation of hydroxylamine and its salts which is readily adaptable to commercial operations. Another object of the invention is to provide a process which avoids the disadvantages of the prior art methods. Further objects will become apparent from the ensuing description of the invention.

In general, the present invention comprises catalytically hydrogenating N-nitroso dialkylamines in the presence of an acid to obtain hydroxylamine or salts thereof in relatively high yields. The N-nitroso dialkylamines capable of being utilized in the process correspond to the formula

wherein R and R' are either straight or branched chain alkyl groups having from about one to six, preferably about one to three, carbon atoms. It is contemplated that R and R' may either be the same or different alkyl groups, which include methyl, ethyl, n-propyl, isopropyl, n-butyl, isobutyl, tertiary butyl, the various pentyls, etc. The alkyl groups may also contain functional groups such as hydroxyl, amino, imino, ether, etc. or any other group which does not interfere in the reaction. For example, the process may be carried out utilizing N-nitroso diethanolamine as the feed material.

Noble metal catalysts, preferably group VIII metals, may be effectively employed as the hydrogenation catalysts. Examples of such metals include platinum, palladium, rhodium, ruthenium, etc. The use of a platinum catalyst is especially preferred. It will be understood that the hydrogenation catalyst may be supported on such conventional carriers as carbon, silica gel, activated charcoal, alumina, etc.

In accordance with the invention, it has been found that in order to prepare hydroxylamine by the above described process, it is essential that the hydrogenation reaction be carried out in the presence of an inorganic or organic carboxylic acid. In the absence of this acid, the hydroxylamine apparently is unstable and such undesirable products as ammonia and ammonium chloride are obtained. Examples of acids which can be successfully utilized are hydrochloric, sulfuric, nitric, acetic and oxalic.

Utilizing hydrochloric acid and a platinum catalyst for illustrative purposes, the overall reaction involved in the instant process is believed to be as follows:

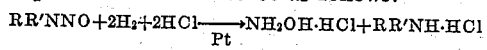

The reaction temperature is within the range of about 5° to 60° C., preferably about 15° to 35° C., while the pressure employed will be about 1 to 100 atmospheres, preferably about 1 to 50 atmospheres. It has also been found that the molar ratio of the acid to the N-nitroso dialkylamine should be at least about 2 to 1 and may be as high as 8 to 1, with a ratio of about 4 to 1 being preferred.

The hydroxylamine salt prepared in accordance with the above described method may be separated from the other reaction products by conventional procedures, which form no part of this invention. As seen from the above equation, the process of this invention leads to the direct preparation of the acid salt of hydroxylamine. The hydroxylamine can be liberated from the acid salt, if desired, by neutralization with a base such as sodium hydroxide. The hydroxylamine salt may be separated from the dialkylamine salt by crystallization, and to facilitate this separation in certain instances it may be advantageous to employ an additional solvent such as an alcohol or ether.

The invention will be more fully understood by reference to the following illustrative example:

Example 20 ml. of N-nitroso dimethylamine in 93 ml. of concentrated hydrochloric acid was hydrogenated at 1000 p.s.i. initial pressure using a platinum-on-carbon catalyst. The reaction temperature was approximately 25° C. After about twenty three hours the pressure drop was 500 p.s.i. Titration of an aliquot of the final reaction product mixture with titanium trichloride indicated a 31.5% yield of hydroxylamine. The remaining solution was evaporated to dryness. A portion of this solid was also titrated with titanium trichloride and indicated a 31.5% yield of hydroxylamine. Another portion of the solid was employed to prepare an oxime of cyclohexanone having a melting point of 91° C. (literature value 91° C.). No hydrazine derivatives were found in the reaction product mixture.

The foregoing data show that hydroxylamine can be prepared in a direct and commercially attractive manner by following the process of this invention.

While a particular embodiment of the invention is shown above, it will be understood that the invention is obviously subject to variance and modification without departing from its broader aspects. For example, it is possible to recover the dialkylamine acid salt by-product from the reaction mixture and react it with sodium nitrite to produce the N-nitroso dialkylamine starting material. This regeneration of the starting material would obviously contribute to making the instant process commercially attractive for continuous operation. It will be understood, therefore, that other modifications and variations may be employed within the scope of the foregoing description of the invention and the following appended claims.

What is claimed is:

1. A method for preparing an acid salt of hydroxylamine which comprises catalytically hydrogenating a N-nitroso dialkylamine with elemental hydrogen in an acid medium from the group consisting of hydrochloric acid, sulfuric acid, nitric acid, acetic acid and oxalic acid and in the presence of an elemental noble metal from group VIII, said N-nitroso dialkylamine have the formula RR'NNO wherein R and R' are alkyl groups of one to six carbon atoms to produce the hydroxylamine salt of said acid.

2. A method for preparing an acid salt of hydroxylamine which comprises catalytically hydrogenating with elemental hydrogen a N-nitroso dialkylamine having the formula RR'NNO wherein R and R' are alkyl groups of one to six carbon atoms in the presence of an acid from the group consisting of hydrochloric acid, sulfuric acid, nitric acid, acetic acid and oxalic acid in a molar ratio of at least two moles of the acid per mole of the N-nitroso dialkylamine and in the presence of an elemental noble metal from group VIII to produce the hydroxylamine salt of said acid.

3. A method which comprises catalytically hydrogenating N-nitroso dimethylamine with elemental hydrogen at an elevated pressure and at from about 5 to about 60° C. in the presence of hydrochloric acid in an amount of at least two moles per mole of the N-nitroso dimethylamine and in the presence of elemental platinum to produce the hydrochloric acid salt of hydroxylamine.

4. The method of claim 1 wherein alkyl groups R and R' are the same.

5. The method of claim 1 wherein alkyl groups R and R' are different.

6. The method of claim 1 wherein said N-nitroso dialkylamine is N-nitroso dimethylamine.

7. The method of claim 1 wherein said N-nitroso dialkylamine is N-nitroso diethanolamine.

8. The method of claim 1 wherein said group VIII noble metal is platinum.

9. The method of claim 1 wherein said group VIII noble metal is palladium.

10. The method of claim 2 wherein said alkyl groups have from about one to three carbon atoms.

11. The method of claim 2 wherein said alkyl groups are methyl.

12. The method of claim 2 wherein said acid is hydrochloric acid.

13. The method of claim 2 wherein said catalyst is platinum.

References Cited in the file of this patent

UNITED STATES PATENTS 2,628,888    Benson  ----------------  Feb. 17, 1953

OTHER REFERENCES

Mellor: "A Comprehensive Treatise on Inorganic and Theoretical Chemistry," Longmans, Green and Co., New York, N.Y., vol. 8, 1928, page 280.